United States Patent [19]

Musselmann et al.

[11] Patent Number: 4,592,513
[45] Date of Patent: Jun. 3, 1986

[54] PULPER DEVICE

[75] Inventors: Walter Musselmann; Theodor Bähr; Helmut Thumm, all of Heidenheim, Fed. Rep. of Germany

[73] Assignee: J. M. Voith, GmbH, Heidenheim, Fed. Rep. of Germany

[21] Appl. No.: 542,126

[22] Filed: Oct. 14, 1983

[30] Foreign Application Priority Data

Oct. 19, 1982 [DE] Fed. Rep. of Germany ....... 3238589
Nov. 5, 1982 [DE] Fed. Rep. of Germany ....... 3240828

[51] Int. Cl.$^4$ ............................................. B02C 23/38
[52] U.S. Cl. .................................. 241/46.17; 241/69; 241/152 R
[58] Field of Search ............... 241/46.11, 46.17, 56, 241/69, 152 R, 29, 28; 162/4, 55

[56] References Cited

U.S. PATENT DOCUMENTS 3,550,527 12/1970 Sinitsin et al. ..................... 241/56 X
4,017,033 4/1977 Tra ................................. 241/46.17 X
4,231,526 11/1980 Ortner et al. .................. 241/46.17 X
4,405,450 9/1983 Selder ........................... 241/46.17 X
4,456,183 6/1984 Christ .............................. 241/46.17

Primary Examiner—Mark Rosenbaum
Attorney, Agent, or Firm—Grimes & Battersby

[57] ABSTRACT

An arrangement is provided for use in treating suspensions of waste paper in waste paper dressing plants. The arrangement includes a comminuting apparatus which includes a disintegrating rotor wheel which has a transport and disintegrating affect is provided in combination with a pulper device. The disintegrating rotor wheel is adapted to rotate in advance or otherwise in front of a sieve arranged perpendicular to the axis of rotation of the disintegrating rotor wheel and which divides the interior of the comminuting apparatus into a useful fraction compartment and a disintegrating compartment. A conduit tube is provided for connecting the pulper device to the comminuting apparatus and is connected to the pulper device at the bottom, side or center thereof. In this manner, only that portion of the suspension which includes the impurity contents is transported from the pulper device to the comminuting apparatus. The comminuting apparatus thus serves to remove accumulated impurities from the pulper device.

16 Claims, 4 Drawing Figures

PULPER DEVICE

BACKGROUND OF THE INVENTION

The present invention relates generally to a pulper device and, more particularly, to apparatus which is adapted to be used in conjunction with a pressureless pulper device for disintegrating waste paper. The use of pressureless pulping devices is well known. Reference may be had, for example, to West German Offenlegungschrift DE-OS No. 29 41 439, the disclosure of which is hereby incorporated herein by reference thereto. The apparatus includes a forward or frontal admission conduit which is provided downstream of the pulper. A transport and disintegrating wheel is provided in the apparatus for producing therein a degree of turbulence in a predetermined axis of rotation which is essentially concentric to the entry opening to the apparatus.

With pulper devices of this type or similiar types which are used for processing bales of waste paper, there exists an inherent difficulty in removing constituent impurities and other contaminants from the pulper. Heretofore, it was necessary with the prior art devices to periodically shut down the pulper device and, using a separate material discharge pipe, drain the pulper. As described, for example, in West German Offenlegungschrift DE-OS No. 29 41 439, it was necessary to connect apparatus to the material discharge pipe which included rotary comminuting means to comminute the paper shreds which had been removed from the pulper and which had not as yet been disintegrated. It was found, however, that such rotary comminuting means also tended to comminute the contaminants particles and reintroduce them as well as the comminuted fiber components back into the pulper.

Additionally, such devices also tended to require extensive waste discharge systems requiring specific and relatively complex timed sequences in order to continuously provide and guarantee an efficient and smooth running pulper purification process. As such, it has been found that prior art systems were extremely expensive to operate and tended not to be completely safe for the average individual to operate.

In the utilization of such pressureless pulper devices, it has been found that a certain degree of turbulence develops due to the rotation of its rotor and it has been found that lightweight material tends to accummulate in the center portion of the pulper. This phenomenon has been advantageously used to remove certain impurities and contaminents since its has been found that such impurities tends to spin about and accumulate at the center of the pulper where they can be relatively easily removed by the use of a ragger rope which is introduced into the pulper. Heavier impurities are typically discharged from the bottom of the pulper by the use of a separate heavy impurity gate.

It will be appreciated that by the use of the apparatus of the present invention, it is possible to eliminate the need for the use of such a separate heavy impurity gate at the bottom of the pulper. Thus, it is possible to provide a substantially simpler and less efficient pulper device than devices heretofore used.

OBJECTS AND SUMMARY OF THE INVENTION

An object of the present invention is to provide apparatus which is adapted to be used in association with a pressureless pulper device for disintegrating waste paper.

It is another object of the present invention to provide such apparatus which permits removal of impurities and contaminants at a relatively early stage of the pulper purification process.

It is yet another object of the present invention to provide such apparatus wherein the impurities and contaminants are removed in a safe and cost efficient manner.

It is still another object of the present invention to provide such apparatus wherein the pulper device does not have to be periodically shut down to permit removal of impurities and contaminants.

It is still yet another object of the present invention to provide such apparatus which can eliminate the necessity for the use of extensive waste discharge treatment systems of the type heretofore required.

The above objects and advantages are achieved by providing apparatus for use in association with a pressureless pulper device for disintegrating waste paper. The apparatus includes a forward or frontal admission conduit positioned directly downstream from the pulper device. The apparatus includes a transport and disintegrating wheel adapted to produce in the device a certain degree of turbulence having a defined axis of rotation substantially concentric with its entry opening. The apparatus includes a sieve positioned substantially perpendicular to the axis of rotation and which separates the apparatus into a disintegrating compartment and a discharge compartment. A fractional discharge conduit or pipe is provided connected to and extending from the discharge area and a reject discharge conduit or pipe is provided connected to and extending from the disintegrating compartment. Shut off valves are further provided in the two discharge conduits or pipes.

In a preferred embodiment, shutoff valves are provided between the pulper and the downstream apparatus. The shutoff valves in the discharge conduits are cyclically operated in opposite directions. The disintegrating wheel is provided in close proximity to the sieve and the pump impeller is provided in the discharge compartment.

Using the measures provided in accordance with the present invention, the eddy currents which are generated as a result of the turbulence are used to effectively provide a relatively simple and inexpensive means for discharging waste impurities which are contained in the suspension in the pulper device. The conventional ragger rope may still be maintained so as not to impair the mode of operation of the pulper. Additionally, if desired the heavy impurities gate may also still be utilized. For the most part, however, the coarse or large sized impurities are now discharged by the apparatus of the present invention which is provided downstream of the pulper device. It is advantagous to omit the sieve in front of the material discharge pipe. The use of such sieves serve mainly for use in association with pulpers which operate in high consistency ranges (i.e., above about 6% atro) and with waste papers which are not particularly soiled and not having a particularly large amount of sheet stock. The apparatus of the present invention is particularly suitable for use in association with vertical pulper devices, i.e. pulper devices which have a rotor device which rotates about a vertical axis with the disintegrating wheel. It will, of course, be appreciated however, that such devices can also operate in conjunction with a pulper device which includes a rotor device which rotates around a horizontal axis as well.

The novel features which are considered as characteristic of the invention are set forth in particular in the appended claims. The improved apparatus itself, however, both as to its construction and its mode of operation, together with additional features and advantages thereof, will be best understood upon review of the following detailed description of certain specific embodiments with reference to the accompanying drawings.

DESCRIPTION OF THE PREFERRED EMBODIMENTS

Figure 1:
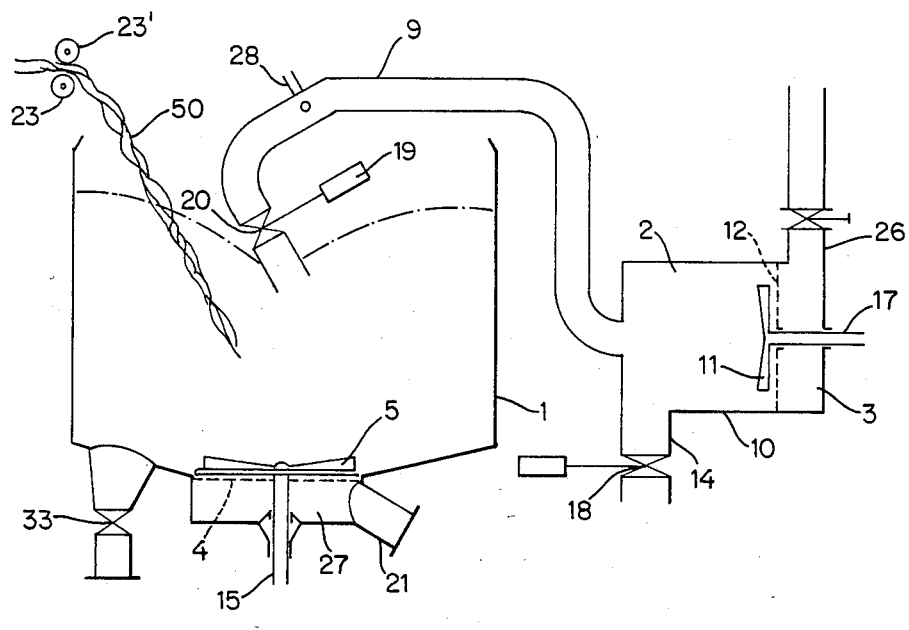
FIG. 1 illustrates in diagrammatical cross-sectional form a vertical type pulper device in association with the apparatus of the present invention.

As shown in FIG. 1, a pulper device 1 is provided which includes a disintegrating rotor (Breaker disc) or wheel 5 which is adapted to rotate about a drive shaft 15 which is provided in a substantially vertical axis. As a result of the rotation of the rotor 5, turbulence or eddys are generated in the suspension within the pulper device 1 and in the same vertical axis of rotation as the rotor 5. As the rotor 5 rotates and causes the resultant turbulence, the waste materials in the suspension which result from the impurities tend to spin and rise to the surface about the center portion of the turbulent suspension. A ragger rope 50 is then introduced into the pulper device 1 between rollers 23 and 23' to effect removal of the waste materials from the suspension. The rotor 5 rotates above a sieve 4 which is provided at the bottom of the pulper device 1 which divides the interior of the pulper device 1 into a useful fraction compartment 27 provided below the rotor 5 and the remaining suspension above the rotor 5 in the interior. In this manner, the useful fraction of the suspension tends to fall into the useful fraction compartment 27 below the rotor 5 while the remaining portion of the suspension tends to rise above the rotor 5. The useful fraction of the suspension is then extracted through useful fraction conduit 21 which is provided in useful fraction compartment 27.

In the pulper device 1 of the embodiment of FIG. 1, a heavy impurity gate 33 is provided at the bottom of the pulper device 1. The entrance into the heavy impurity gate from the inside of the pulper device 1 is from a location in the pulper device 1 above the horizontal plane of the rotor 5. Heavy impurities which may accumulate in the suspension during operation of the pulper device 1 may be periodically removed from the pulper device 1 through this gate 33.

A material discharge pipe 9 is provided positioned above the pulper device 1 and extending into the center of the pulper device 1. A slide valve 20 is provided at the end of the material discharge pipe 9 which is located slightly above the surface of the suspension within the pulper device 1. The slide valve 20 is operated and controlled by a servomotor 19 remotely spaced from the valve 20.

The material discharge pipe 9 comprises a siphon loop and is adapted to draw off portions of the suspension to comminuting apparatus 10 which is provided downstream from the pulper device 1. The comminuting apparatus 10 includes a disintegrating rotor 11 which turns about and in an axis of rotation in alignment with an input shaft 17. An outlet pipe or conduit 26 is provided at the top of the comminuting apparatus 10 above the disintegrating rotor 11 and a heavy impurity gate 14 including a shutoff valve 18 is provided at the bottom of the comminuting apparatus 10. It will be appreciated that the internal capacity of the comminuting apparatus 10 is substantially smaller than the internal capacity of the pulper device 1.

It has been found that during rotation of the rotor 5 in the pulper device 1, lightweight impurities and contaminants tend to accumulate in the core of the eddy of turbulence and these impurities and contaminants can easily be removed through material discharge pipe 9 to comminuting apparatus 10. To effect such removal, the slide valve 20 is periodically opened by servomotor 19. The rotor 11 within the comminuting apparatus 10 is continuously running and upon opening of the slide valve 20 the impurities or contaminants collected in the core of the pulper device 1 are drawn out of the pulper device 1 through the material discharge pipe 9 and into the comminuting apparatus 10. The impurities are then drawn out of the comminuting apparatus 10 and then into a subsequent classifying device (not shown) downstream of the comminuting apparatus 10. The subsequent classifying device can be, for example, a vibration classifier or a sizing drum with a horizontal axis of rotation which operates in a pressureless environment.

In subsequent classifying device, the impurities drawn into it are then finally sorted out leaving intact the utilizable fibers for subsequent processing. Heavy or large impurities are removed from the comminuting apparatus 10 through heavy impurity gate 14. When, however, the slide valve 20 is in a closed position, the rotor 11 of the comminuting apparatus 10 is incapable of emptying the heavy impurities through the heavy impurity gate 14 since it is the action of the rotor 14 which causes the heavy impurities to fall to the bottom of the apparatus 10 and flow out through the gate 14. There is always sufficient suspension in the material discharge pipe 9, however, so that with every new opening of the slide valve the comminuting apparatus 10 is able to accomplish its primary function.

It is preferred that the material discharge pipe 9 be provided at the top of the pulper device 1 since this results in the least impairment of the accumulated waste material. It must be noted that waste paper bales are oftentimes eddied in the pulper device 1 and, as such, they tend to reach the material discharge pipe 9 in a particularly bulky form. In such cases, it may not be preferred to position the material discharge pipe 9 as closely to the upper surface of the suspension as would otherwise be desired. It is conceivable that the material discharge pipe 9 could be positioned perpendicular to the bottom of the pulper device 1, particularly in the event that the rotor 5 was so constructed that the discharge pipe could be lead through the drive shaft 15 of the rotor 5. In such event, however, the shaft 15 would have to be hollow to accommodate the incorporation of such a discharge pipe. Further, the disadvantages of having to provide a rather complex and expensive bearing would also have to be considered. It will be appreciated, however, that by introducing the material discharge pipe 9 from the bottom, i.e. askewed from the sides into the core of the eddy, an inherent advantage results, namely the fluid level and pressure in the pulper device 1 tend to press any impurities out through the conduit. Inherent with such an advantage is, however, the above recited disadvantages. Thus, the positioning of the material discharge pipe 9 may vary depending upon the particular types of material being processed.

As shown in FIG. 1, a material admitting pipe 28 is provided in the material discharge pipe 9. Material admitting pipe 28 is adapted to introduce fluid into the comminuting apparatus 10 prior to operation thereof. This is accomplished by closing the slide valve 20 with the conduit 26 having to be extended into a corresponding pressure head. Virtually any fluid, including water, may be used for filling the comminuting apparatus 10.

It will be appreciated that the apparatus of the subject invention may also be readily used with a horizontal type of pulper device having a horizontal rotor shaft. In such case, the material discharge pipe employed therein is preferably introduced into the pulper from the side or the bottom of the pulper device. The sieve of the pulper device which is subsequent to the pulper device would preferably have an aperture width of between about 12 and about 20 mm and, in a preferred embodiment, between about 16 and about 18 mm.

Figure 2:
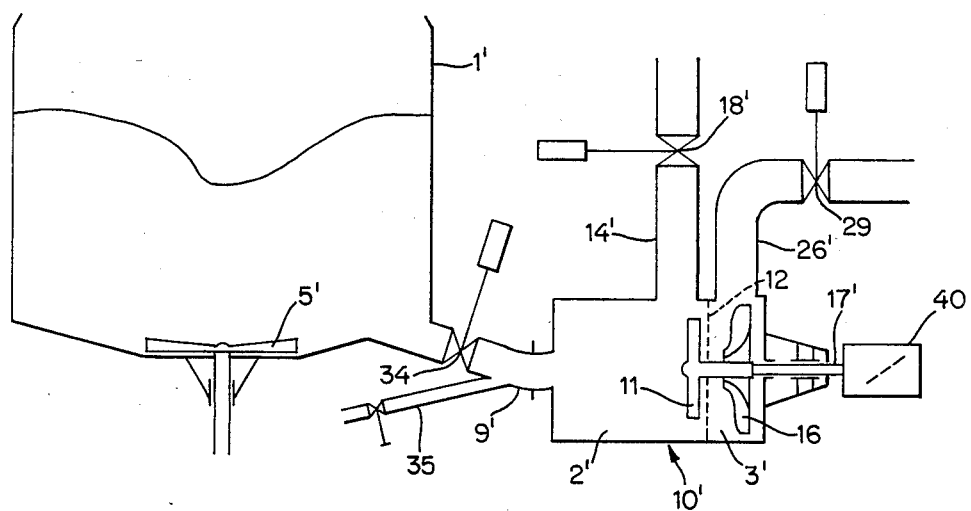
FIG. 2 illustrates a modified version of the apparatus of the present invention.

FIG. 2 is illustrative of a modified version of the comminuting apparatus of FIG. 1 and constitutes the preferred embodiment of the present invention. In the preferred embodiment of FIG. 2, the pulper device 1' is connected to comminuting device 10' at the lower corner of the pulper device 1' and the suspension is adapted to pass from the pulper device 1' through a material discharge pipe or conduit 9' which includes a slide valve 34 for controlling the flow of suspension into the comminuting apparatus 10'. Within comminuting apparatus 10' is provided a disintegrating compartment in advance of a disintegrating rotor wheel 11 and a pump impeller 16 which is mounted on the same shaft as the rotor wheel 11', A useful fraction conduit 26' is positioned directly above the pump impeller 16 and a slide valve 29 is provided at the end of the useful fraction compartment 26'.

By using the apparatus of the embodiment of FIG. 2, it is possible to eliminate the need for including the heavy impurity gate 33 and the useful fraction conduit 21 which are both required in the embodiment of FIG. 1. The embodiment of FIG. 2 provides for admission of the entire disintegrated waste paper suspension mass into the comminuting apparatus 10' from the pulper device 1' through conduit 9'. In comminuting apparatus 10', the waste paper suspension is further disintegrated by disintegrating rotary wheel 11 and is then transported into useful fraction conduit 26' which includes a slide valve 29 and into reject discharge pipe or conduit 14' which includes a slide valve 18' by the action of pump impeller 16 which works in conjunction with disintegrating wheel 11 to force the suspension through the sieve 12. This causes an accumulation of suspension to form in disintegrating area 2' of the comminuting apparatus 10'. Contaminants or other impurities may be periodically removed from the comminuting apparatus 10' through reject discharge conduit or pipe 14' by opening slide valve 18'. Thus, it will be appreciated that it is best to cyclically or alternately operate the slide valves 18' and 29 mutually in opposite directions, that is when one is open, the other is closed, or vice versa.

The disintegrating rotary wheel 11 and the pump impeller 16 are both provided on the same common rotary shaft 17' and, as such, are both driven by the same motor 40. It will, of course, be appreciated that, if desired, separate shafts could be utilized for driving these elements and one shaft could be mounted as a hollow shaft concentrically about the other.

In order to facilitate the evacuation of reject material or other impurities through reject conduit 14', an admission conduit 35 is provided for admitting fluids, preferably water, into the comminuting apparatus 10'.

As previously stated, the slide valves 34, 18' and 29 are intended to operate cyclically and intermittently. From the pulper 1', a certain predetermined amount of suspension is transported into the comminuting apparatus 10' through slide valve 34 during which time the slide valve 29 in the useful fraction conduit 26' is generally left open. When sufficient impurities have accumulated in the disintegrating compartment 2', slide valves 29 and 34 are closed and slide valve 18' is opened. Generally, the discharge of impurities or contaminants from the disintegrating compartment 2' takes place with the assistance of disintegrating rotary wheel 11 with the continuous admission of diluting fluid, i.e., water, through conduit 35. It may be necessary to introduce the water through conduit 35 under pressure.

Figure 3:
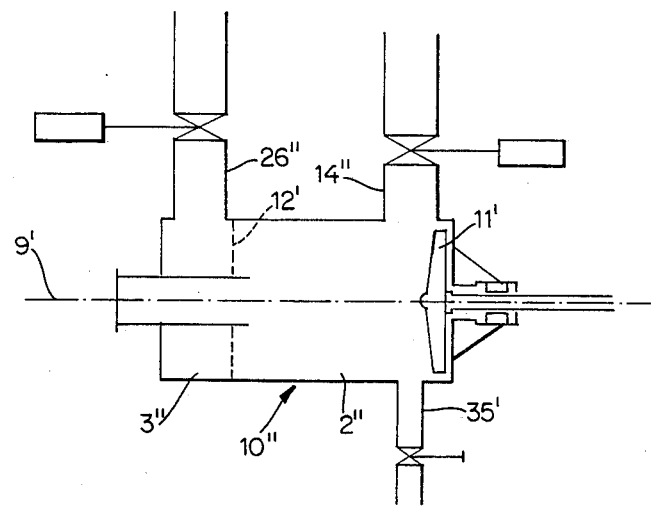
FIG. 3 illustrates still another modified version of the apparatus of the present invention.

FIG. 3 illustrates still another aspect of the present invention and, in particular, a modified version of the comminuting apparatus thereof. In the embodiment of FIG. 3, the comminuting apparatus 10" includes a sieve 12' positioned in the axial area of the comminuting apparatus 10" opposite from the disintegrating rotary wheel 11'. The suspension is introduced into the comminuting apparatus through material discharge pipe 9' which is connected to a pulper (not shown). The suspension then passes through the discharge area 3" and the sieve 12' and into the disintegrating area 2'. Rejects or contaminants are then emptied in a manner similar to that of FIG. 2 using the disintegrating rotary wheel 11' in combination with the introduction of water under pressure. The contaminants or rejects are then led out of the comminuting apparatus 10" through conduit 35'.

Figure 4:
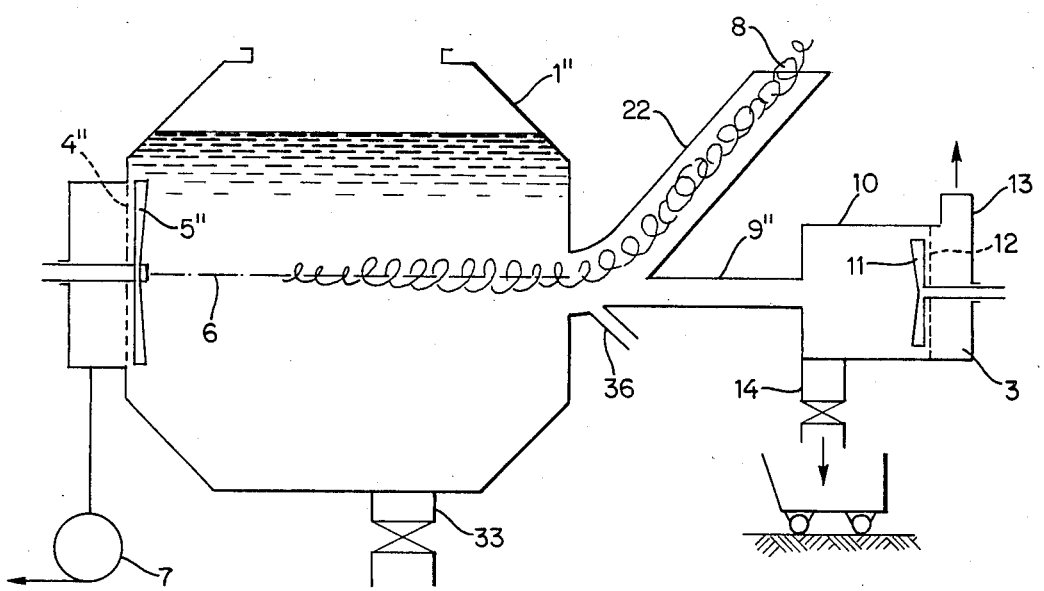
FIG. 4 illustrates a modified version wherein the pulper device includes an impurities evacuation tube.

FIG. 4 is illustrative of still another embodiment of the present invention, wherein a material disintegrating container 1" is provided. An impurities evacuation tube 22 is provided interconnected to the container 1" and a heavy impurity gate 33 is provided at the bottom of the container 1"'. A lateral sieve 4' is provided behind a rotor 5" which rotates with a horizontal axis of rotation 6. A pump 7 is provided for leading away the useful fraction penetrating through the sieve 4". An additional material discharge pipe 9" is provided connected to and branching off from the impurities evacuation tube 22.

During operation, the rotation of the rotors 5" causes the formation of a turbulence in the pulper device 1" with the axis of the turbulence being an extended rotor axis of rotation and in which the lightweight material which also includes basically the spinning material, tends to accumulate. The spinning substances are removed as an accumulation of waste material by the use of a ragger rope (not shown) through impurities evacuating tube 22. Heavy impurities tend to accumulate at the bottom of the pulper device 1" and may periodically be removed through the gate 33. Furthermore, the separation of the lightweight material takes place through the additional material discharge pipe 9". Since such material tends to accumulate basically in the center of the pulper device 1", the suspension mass which is located above tends to force the lightweight components through the material discharge pipe 9''.

Another advantage which occurs with such apparatus is that due to the generally required addition of sprinkling water through nipples 36, a diluted suspension results in that area. Thus, the losses of fiber are kept relatively low during discharge through material discharge pipe 9''. An inherent advantage of such a construction is that due to the size of the accumulation of waste material 8 in impurities evacuating tube 22, large paper components cannot fit into the material discharge pipe 9''. Rather, they are comminuted by the motion of the accumulation of waste material before entering the material discharge pipe 9'' and, thus, the opening is kept clear.

As shown in FIG. 4, the material discharge pipe 9'' is interconnected with the comminuting apparatus 10 of FIG. 1 which is also provided with a rotor 11 positioned in front of a sieve 12. The sieve 12 serves to separate a useful fraction compartment 3 from the rotor 11 and the remaining contents of the apparatus in which the rotor is located. The useful fraction is lead back into the cycle through a conduit 13. Since what is being treated is mostly fibrous material, when the opportunity arises, the material is either transmitted back into the pulper device or, alternatively, is transmitted further ahead in the process.

Comminuting apparatus further includes a coarse or heavy impurity gate 14, similar to the one in the pulper, and through which the coarse or heavy impurities may periodically be removed.

It will be appreciated that the described arrangement, particularly the embodiment of FIG. 2 thereof, offers the distinct advantage of providing a pulper device which has relatively easy discharge means, particularly for the discharge of trash or other contaminants. No expensive apparatus is required. All that is necessary is a certain cyclically timed connection of different slide valves. With such apparatus, the operator may easily collect the necessary experience to set the correct cycle time (station time). In such manner, the conditions are usually such that the opening times of the slide valves 29 and 20 (of FIG. 1) are much longer than the opening times of the slide valves 18 and 18' in the rejects discharge pipes.

The advantages of the subject apparatus in comparison to that of the prior art devices where the material has to be led back into the pulper device after the subsequent apparatus, is that the suspension which is extracted behind the sieve from the discharge compartment 3 or 3' or 3'' can be lead back further ahead into the main cycle as useful fraction. As a result, no double loading of the pulper device is necessary.

It should further be noted that the capacity of the comminuting apparatus 10, 10' or 10'' of the present invention which is provided downstream from the pulper device, is relatively small in comparison to the pulper device, generally one-fifth to one-tenth the size thereof.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

Wherefore we claim:

1. A pressureless arrangement for disintegrating a water paper suspension, said arrangement including a pressureless pulper device including means for generating a center core of turbulene therein; a substantially pressureless comminuting apparatus having a center core of turbulence therein and connected directly to and located downstream of said pulper device; and conduit means being positioned in relative close proximity to the cores of tubulence in said pulper device and in said comminuting apparatus and directly connecting said pulper device to said comminuting apparatus through an entry opening in said comminuting apparatus, said apparatus including a disintegrating rotor wheel adapted to produce in said apparatus a turbulence, the axis of rotation of which is generally concentric to said entry opening, wherein said comminuting apparatus includes a sieve positioned substantially perpendicular to the axis of rotation of the said rotor wheel which divides the interior of said apparatus into a disintegrating compartment and a discharge compartment and wherein a useful fraction discharge pipe is connected to said discharge compartment and a reject discharge pipe is connected to said disintegrating compartment, said two discharge pipes including shutoff valves for controlling same.

2. The arrangement of claim 1 wherein said conduit means enter said pulper from above.

3. The arrangement of claim 1 wherein said rotor wheel is a transport and disintegrating wheel.

4. The arrangement of claim 1 wherein a shutoff valve is provided in the conduit means connecting the pulper device and the comminuting apparatus.

5. The arrangement of claim 1 wherein the shutoff valve for the fraction discharge pipe is adapted to be operated alternatively with the shutoff valve for the reject discharge pipe.

6. The arrangement of claim 1 wherein the disintegrating rotor wheel is positioned in relatively close proximity to the the sieve.

7. The arrangement of claim 6 wherein a pump impeller is further provided in the discharge compartment.

8. The arrangement of claim 1 wherein the sieve is provided at the entry side of the comminuting apparatus and wherein the disintegrating rotor wheel is provided at the opposite side of said apparatus.

9. The arrangement of claim 8 wherein the conduit means connecting the pulper device to the comminuting arrangement passes through the discharge compartment and opens into the sieve in the disintegrating compartment.

10. The arrangement of claim 1 wherein a conduit is further provided for introducing a diluent into the disintegrating compartment.

11. The arrangement of claim 10 wherein said diluent is water and Wherein said means for introducing said diluent comprises a conduit which opens into the disintegrating compartment.

12. The arrangement of claim 1 wherein said comminuting apparatus is contained within a housing and wherein said housing is substantially symmetrical relative to the axis of rotation of the disintegrating rotor wheel.

13. A pressureless pulper device including a rotor wheel having a substantially horizontal axis of rotation adapted to cause turbulence in a suspension, a sieve located in a side wall of said pulper device and located behind said rotor wheel and an impurities evacuating tube including an admitting opening in substantial alignment with the axis of rotation of said rotor wheel and having a material discharge pipe connected to said evacuating tube, said pulper device further including a pressureless comminuting apparatus having a center core of turbulence and directly connected to said pulper device, said comminuting apparatus including a disintegrating rotor wheel in communication with said material discharge pipe, said disintegrating rotor wheel adapted to rotate in a direction substantially parallel to a second sieve which defines a useful fraction compartment.

14. The pulper device of claim 13 wherein the useful fraction compartment of said comminuting apparatus is separated from the disintegrating rotor wheel by said second sieve.

15. The pulper device of claim 14 wherein said comminuting apparatus is contained within a housing and wherein said housing is substantially symmetrical relative to the axis of rotation of the disintegrating rotor wheel.

16. the pulper device of claim 15 wherein the axis of rotation of the disintegrating tube corresponds to the axis or rotation of turbulence caused by the rotor wheel in said pulper device.

* * * * *